United States Patent Office
3,344,960
Patented Oct. 3, 1967

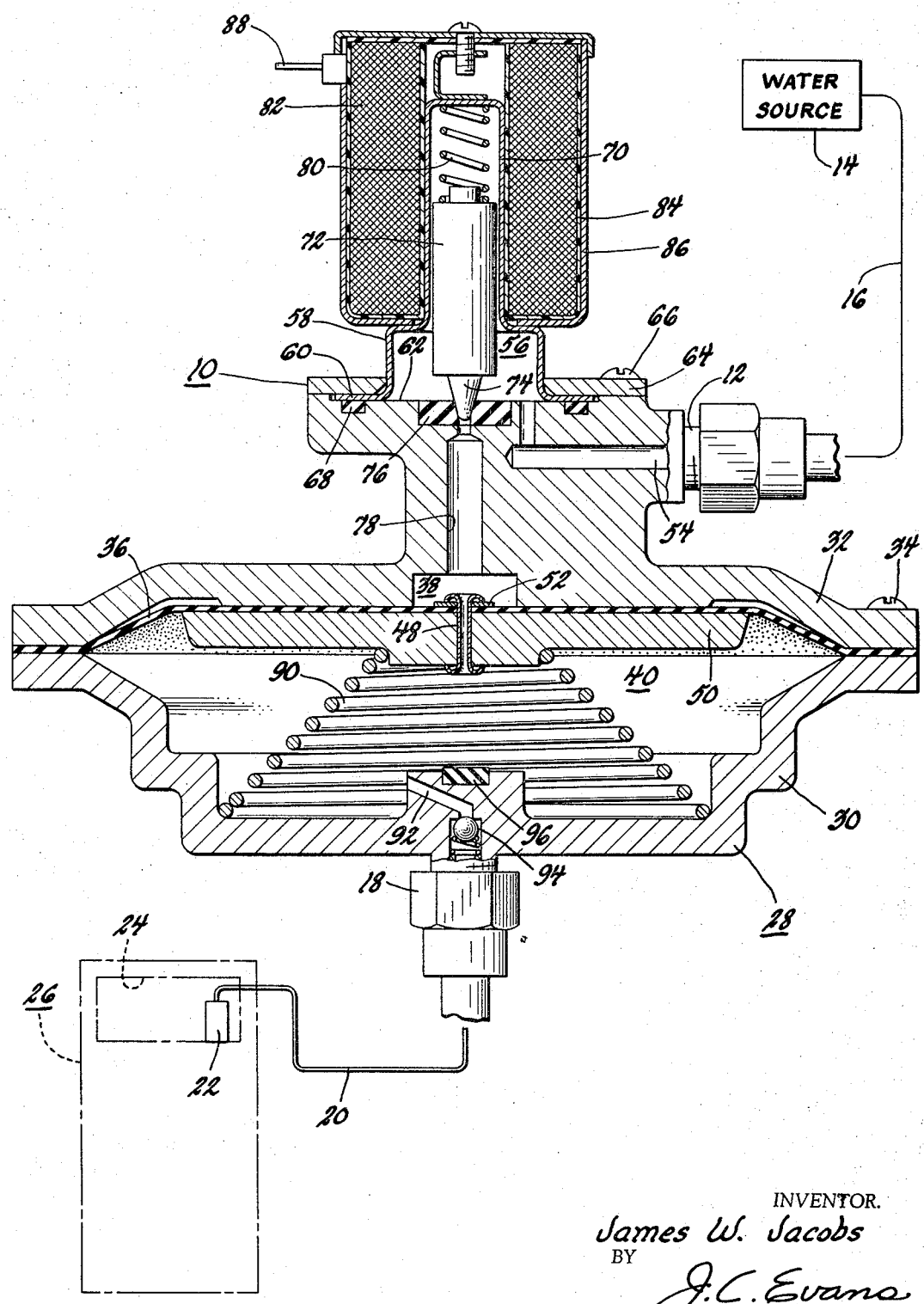

3,344,960
FLUID METERING DEVICE
James W. Jacobs, Dayton, Ohio, assignor to General Motors Corporation, Detroit, Mich., a corporation of Delaware
Filed Aug. 30, 1965, Ser. No. 483,769
1 Claim. (Cl. 222—335)

This invention is directed to fluid metering devices and more particularly to fluid transfer valves for directing a predetermined quantity of fluid from a pressure source to a point of use.

In automatic ice maker arrangements, it is desirable to include fluid transfer means for directing water from a pressurized source into molds for receiving a measured amount of water from the source. The molds are located in a suitable low-temperature compartment such as a freezer compartment of a refrigerator to freeze the water into discrete particles of ice.

The fluid transfer means preferably should accurately measure a predetermined quantity of water and direct it into the freezing mold without overfilling the mold in an undesirable manner. Furthermore, it is desirable that the means for metering water from a pressure source and then directing it into the freezing mold be automatically operative whereby a predetermined quantity of pressurized fluid is directed into the freezing mold as needed while isolating the pressure source from the freezing mold after the mold is filled.

An object of the present invention, therefore, is to improve metering devices for supplying water to an automatic ice maker by the provision of a valve assembly including plural serially, fluidly communicated compartments, a first of said compartments being continually pressurized from a source of water, a second of said compartments receiving water from said continuously pressurized compartment for metering a predetermined amount of water from the pressurized source of water and a third of said compartments being separated from the second of said compartments by a flexible diaphragm actuatable upon communication of the second compartment with the first compartment to transfer water in the third compartment exteriorly thereof.

A further object of the present invention is to improve metering devices for automatically transferring a predetermined quantity of water from a pressurized water source to a point of use wherein an inlet chamber is provided in continuous communication with the source of pressurized fluid for supplying pressurized fluid into a chamber having a diaphragm therein for dividing said chamber into two variable volume compartments and wherein one of the compartments is fluidly communicated with the pressurized inlet chamber by first valve means to direct pressurized fluid into the first compartment and wherein the diaphragm is responsive to pressurized flow into the first compartment to transfer fluid in the second compartment exteriorly thereof.

A still further object of the present invention is to improve ice maker transfer valves by the provision of a pressure responsive diaphragm selectively movable between first and second predetermined positions within a fluid chamber wherein the diaphragm means separates the chamber into a first metering compartment and a second fluid transfer compartment and wherein the diaphragm is responsive to a predetermined pressure buildup in the first compartment to move the diaphragm from its first position to its second position to effect a transfer of previously metered fluid in the fluid transfer chamber exteriorly thereof.

A further object of the invention is to improve metering devices for filling ice cube containers or the like by the provision of an automatically controlled pressurizable chamber in communication with a pressure source having an outlet opening therefrom through which pressurized fluid is discharged in response to energization of solenoid valve means and further including a flexible diaphragm disposed within a fluid receiving chamber dividing said chamber into a fluid receiving metering compartment and a fluid transfer compartment having an outlet opening therefrom, and wherein the diaphragm is associated with means for maintaining it in a first predetermined position when the solenoid valve is energized to direct pressurized fluid into the metering compartment and for maintaining it in a second predetermined position to transfer fluid from the metering compartment into the fluid transfer compartment when the solenoid valve means is de-energized.

Further objects and advantages of the present invention will be apparent from the following description, reference being had to the accompanying drawing wherein a preferred embodiment of the present invention is clearly shown.

The drawing shows a vertical, sectional view of a fluid metering device of the present invention in association with an automatic ice maker system.

Referring now more specifically to the drawing, a fluid metering device 10 is illustrated including an inlet 12 communicated with a pressurized water source 14 by a conduit 16. The water source 14 in the illustrated embodiment of the invention is, for example, a household water supply system. The assembly 10 further includes an outlet fitting 18 connected to a conduit 20 for supplying water to an automatic ice maker 22. The ice maker 22 is typically included within a freezer compartment 24 of a refrigerator assembly 26.

In order to obtain reliable ice production in automatic ice maker arrangements, it is desirable to include an automatic fluid metering or transfer device between a pressurized water source and the ice maker that is automatically responsive to predetermined conditions in the ace maker such as ejection of frozen ice particles from the ice maker into a storage compartment. Following such ejection, an electrical signal can be produced that will condition the valve assembly 10 to effect a transfer of fluid from the pressure source 14 into the automatic ice maker 22 for filling the mold cavities therein with an additional predetermined amount of water.

In the illustrated embodiment of the invention the metering and fluid transfer assembly 10 includes a housing 28 including a first housing portion 30 and a second housing portion 32 joined together at their outer periphery by suitable means such as screws 34. The housing portions 30, 32 form a chamber in which is located a flexible diaphragm 36 that separates the chamber into a metering compartment 38 and a fluid transfer compartment 40. The metering and fluid transfer compartments 38 and 40 are fluidly communicated through a tubular member 48 directed through the diaphragm 36 and through a backing plate 50 on the diaphragm. The tubular member 48 is shown representatively as having the ends thereof turned over against the backing plate 50 and against a pick-up washer 52 on the opposite side of the diaphragm 36 so as to be fixedly secured to the diaphragm 36.

The housing portion 32 further includes an inlet passageway 54 therein to direct pressurized fluid from the inlet fitting 12 into a continuously pressurized chamber 56 formed by an open-ended, cup-shaped member 58 having a radially outwardly turned edge 60 at the open end thereof that is held against a flat surface 62 on the housing portion 32 by a plate 64 secured to the surface 62 by suitable means such as screws 66. The chamber 56 is sealed by an annular sealing member 68 supported by the housing portion 32 to surround the open end of the member 58 in sealing engagement therewith. In the illustrated arrangement the member 58 includes an elongated, smaller diameter guide portion 70 in which is located an axially elongated armature 72 having a conically-shaped valving member 74 thereon that is arranged to seat against an annular resilient valve seat member 76 that communicates the chamber 56 with a supply opening 78 in the housing portion 32 to the metering compartment 38 within the housing 28. The armature 72 normally is biased by a spring 80 disposed within the guide extension 70 in a direction so that the valve tip 74 is in sealing engagement with the seat member 76.

A solenoid coil 82 surrounds the guide extension 70 and is electrically insulated therefrom by a suitable liner of electrical insulating material 84. In the illustrated arrangement the solenoid coil 82 further includes an outer housing 86 insulated from the coil 82 by the liner 84. The coil 82 is electrically connected through leads 88 for periodically energizing the solenoid 82 to draw the armature 72 inwardly of the guide extension 70 whereby the valve tip 74 will be raised from the seat 76 so that pressurized fluid in the chamber 56 will be directed into the metering compartment 38. This causes the diaphragm 36 to be forced downwardly against a spring 90 disposed within the fluid transfer compartment 40 having one end thereof in engagement with the backing plate 50 and the opposite end thereof in engagement with the housing portion 30. Fluid in the fluid transfer compartment 40 is thereby forced through an outlet opening 92 in the housing portion 30 thence across a spring biased ball check element 94 into the outlet fitting 18 thence through the conduit 20 into the automatic ice maker 22. Following a predetermined movement of the diaphragm 36, the end of the tubular member 48 engages a resilient stop and valving element 96 to prevent fluid flow from the metering compartment into the fluid transfer compartment 40.

At this time, the solenoid coil 82 is de-energized by suitable control means for sensing the level of water in the molds of the ice maker 22 to cause the spring 80 to move armature 72 to position the valve tip 74 in sealing engagement with the seat member 76 so as to isolate the source of pressurized fluid from the metering compartment 38. The spring 90 then acts on the diaphragm 36 through the backing plate 50 to cause it to move into the position illustrated in the drawing and thereby cause fluid in the metering chamber 38 to be transferred therefrom through the tubular member 48 into the fluid transfer compartment 40 whereby the assembly 10 is conditioned for a subsequent fluid transfer operation from the compartment 40 into the ice maker 22 as discussed above.

While the embodiment of the present invention as herein disclosed constitutes a preferred form, it is to be understood that other forms might be adopted.

What is claimed is as follows:

A fluid transfer and metering device for directing a predetermined measured amount of fluid from a pressure source to a point of use comprising housing means defining a first fluid chamber, movable diaphragm means in said first fluid chamber dividing said fluid chamber into first and second variable volume compartments, means forming an inlet to said fluid chamber on one side of said diaphragm means, means forming an outlet from said fluid chamber on the opposite side of said diaphragm means, passageway means for directing fluid across said diaphragm means between said first and second compartments, means for directing pressurized fluid from a source through said inlet and against one side of said diaphragm means, said diaphragm means responding to pressurization thereof to pump fluid from said second variable volume compartment through said outlet, spring means for biasing said diaphragm means in a direction opposite to the direction of pumping movement thereof when pressurized, said fluid passageway means through said diaphragm means defining a direct communication between said first and second variable volume compartments throughout movement in both directions of said diaphragm means within said fluid chamber, said spring means directing said diaphragm means against said housing means causing fluid transfer through said passageway means from said first variable volume compartment in communication with said inlet and into said second variable volume compartment to prime and completely fill said second compartment with fluid from said first compartment at the beginning of the pumping stroke of said diaphragm means, said diaphragm means upon having pressurized fluid directed thereagainst moving to pump fluid from said second variable volume compartment and through said outlet, fluid flow from said pressurized source filling the increasing volume of said first variable volume compartment between said diaphragm means and said housing means prior to flow of fluid to said second compartment and transfer of fluid from said second variable volume compartment.

References Cited

UNITED STATES PATENTS

| | | | |
|---|---|---|---|
| 2,740,553 | 4/1956 | Maynard | 222—341 X |
| 3,018,923 | 1/1962 | Michie | 222—335 X |
| 3,085,715 | 4/1963 | Douglas | 222—70 |

ROBERT B. REEVES, *Primary Examiner.*

F. R. HANDREN, *Assistant Examiner.*